United States Patent

[11] 3,585,292

[72] Inventor: Norman Allison Crowder, Wilmette, Ill.
[21] Appl. No.: 792,409
[22] Filed: Jan. 21, 1969
[45] Patented: June 15, 1971
[73] Assignee: Columbia Broadcasting System, Inc., New York, N.Y.

[54] FLYING SPOT SCANNERS SCANNING ALTERNATE FILM FRAMES
11 Claims, 5 Drawing Figs.

[52] U.S. Cl. .................................................. 178/7.2, 352/62, 178/6.7, 178/5.2
[51] Int. Cl. ........................................................ G03b35/02, H04n 5/86
[50] Field of Search .......................................... 178/7.2, 6.7 A, 69.5 TV, 5.4 CK; 179/100.3; 352/62

[56] References Cited
UNITED STATES PATENTS
3,290,437   12/1966   Goldmark et al. ............   178/7.2 D Primary Examiner—Richard Murray
Assistant Examiner—John C. Martin
Attorney—Brumbaugh, Graves, Donohue and Raymond ABSTRACT: Continuously moving film having a succession of frames recorded thereon is scanned by a raster of lines moving in the same direction as the film and having a frame scan rate one-half the film frame rate, so that only alternate frames on the film are scanned. Luminance information may be recorded in alternate frames with the corresponding chroma information recorded in the intervening frames; or luminance information about one subject may be recorded in alternate frames with luminance information about another subject recorded in the intervening frames.

PATENTED JUN 15 1971
3,585,292
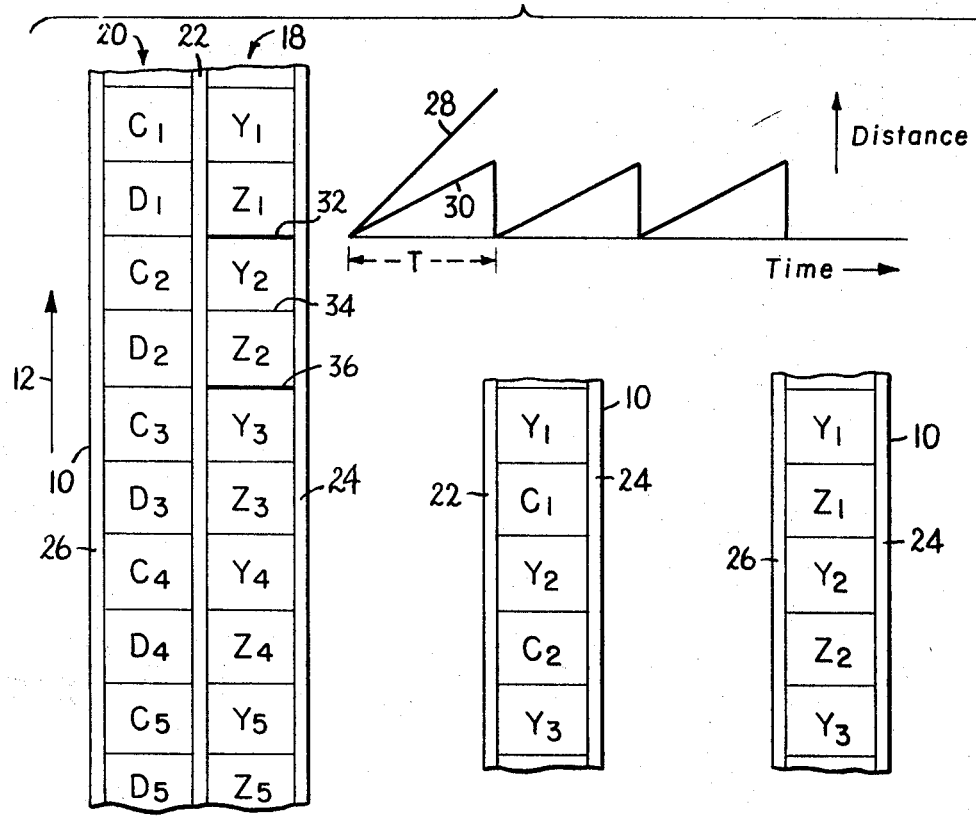
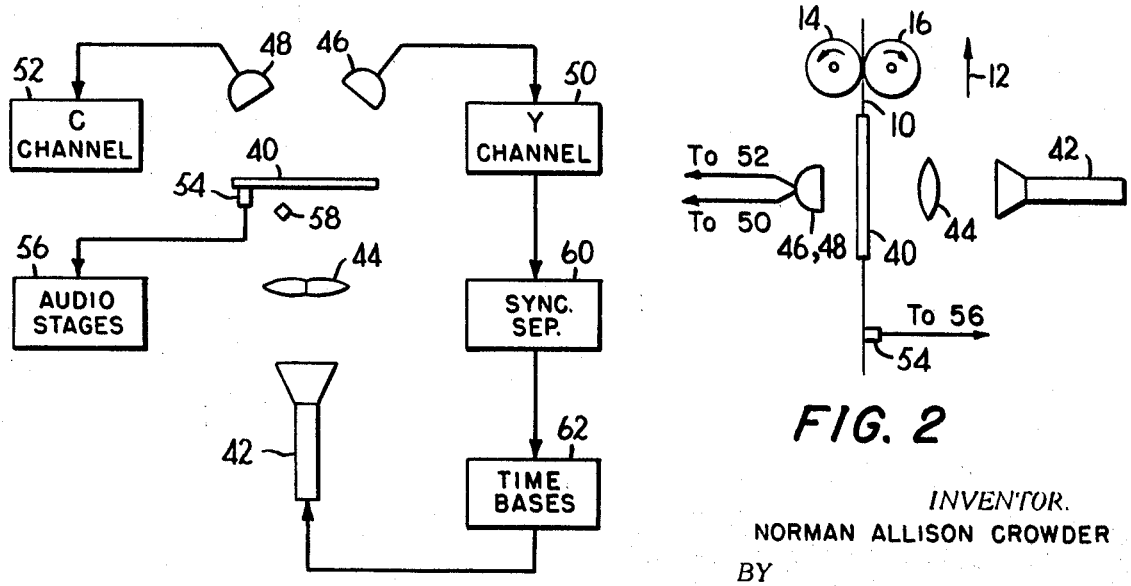
INVENTOR.
NORMAN ALLISON CROWDER
BY
Brumbaugh, Graves, Donohue & Raymond
his ATTORNEYS

FLYING SPOT SCANNERS SCANNING ALTERNATE FILM FRAMES

This invention relates to flying spot scanners for scanning film having a succession of frames recorded thereon to generate video signals representative of the tone value variations over a succession of film frames. Such apparatus may be used, for example, as an attachment to a domestic television receiver for reproducing programs recorded on the film.

The object of this invention is to provide an improved scanning system for such apparatus having a number of advantages which are discussed below.

According to the invention, there is provided apparatus comprising means for moving cinematograph film through a scanning gate at a constant speed, a flying spot scanner arranged to scan the film at the gate with a raster of lines in which the frame scanning is in the same direction as the direction of film movement but at half the speed of the film, and a light responsive device arranged to receive light from the film and thus provide a video signal.

It will be apparent that only alternate frames on the film are scanned and this leads to a number of advantages. Firstly, it doubles the film speed for a given frame size thus enabling small frames to be used to increase the total playing time of a given length of film while still allowing an adequate film speed for reproduction of audio and synchronizing signals. The audio signals may be recorded on a separate magnetic or optical track. Line synchronizing signals can be superimposed in known manner on the audio signals or may be recorded on a separate track. The skipped frames are, of course, not wasted and indeed a further advantage of the invention is that such frames provide a convenient place to record chrominance information when recording color material.

In black and white two entirely different picture sequences are interlaced. A wide variety of frame arrangements is possible, some being described below, and much flexibility in design is permitted, enabling the system to adopt the most favorable aspect ratio, having regard to efficient use of the image area of the flying spot scanner.

The invention will be described in more detail, by way of example, with reference to the accompanying drawings, in which:

FIG. 1 illustrates one frame configuration for recording color, in conjunction with a graphical representation of frame scanning and film movement in accordance with the invention;

FIGS. 1a and 1b show two other frame configurations for color and black and white, respectively;

FIG. 2 is a schematic elevation and block diagram of one embodiment of the invention; and FIG. 3 is a schematic top view of the apparatus shown in FIG. 2.

The film 10 shown in FIG. 1 is moved in the direction of arrow 12 by means of a constant speed drive, represented schematically in FIG. 2 as a capstan 14 and pinch roller 16. The supply and takeup spools are conventional and are not shown. There are two separate rows 18 and 20 of frames on the film, namely, a row 18 of luminance frames and a row 20 of chrominance frames. Between these two rows is an optical synchronization track 22 which is generally opaque but with windows at some suitable spacing, e.g., corresponding to frame or half line period pulses. Along the two edges of the film are two magnetic audio tracks 24 and 26.

When any luminance frame in the row 18 is being scanned, the adjacent chrominance frame in the row 20 is also synchronously scanned. The frames fall into two interlaced sequences. One sequence comprises the luminance frames $Y_1$, $Y_2$, $Y_3$.....and the corresponding chrominance frames $C_1$, $C_2$, $C_3$.....with which the audio track 24 is associated. The other sequence comprise the luminance frames $Z_1$, $Z_2$, $Z_3$.....and the chrominance frames $D_1$, $D_2$, $D_3$ ..... with the audio track 26. Whichever sequence is scanned, the frames of the other sequence are skipped.

To see how this arises, consider the graphs also shown in FIG. 1 and in which the distances travelled by the raster scan and by the film during one frame period are plotted against time. The constant movement of the film 10 in the direction of arrow 12 (i.e., upwards) results in a displacement represented by a line 28 during one frame period T. The frame scanning waveform of the raster is represented at 30 and it will be seen that the direction of frame scanning is also upwards but the slope of the waveform 30 is only half that of the line 28. In other words, the film 10 moves two frames in the time it takes to complete one raster scan.

Consider the scanning of the frame $Y_2$. At the beginning of the frame period, the top edge of the frame $Y_2$, marked with a heavy line 32, is scanned by the bottom line of the raster. At the end of the frame period T, the top edge 32 has moved to the top of the line 28 and the bottom edge 34 of the frame is scanned by the top line of the raster. The top edge 36 of the frame $Y_3$ has now moved to the position ready to be scanned by the first, bottom line of the raster after flyback has occurred. (For simplicity of explanation the frame blanking period has been ignored in this). The frame $Z_2$ is thus skipped completely.

An entirely different configuration is shown in FIG. 1a with only one row of frames, namely, luminance frames $Y_1$, $Y_2$, etc., interlaced with the corresponding chrominance frames $C_1$, $C_2$, etc. In this case, two rasters one above the other, rather than side by side as in FIG. 1, are required for simultaneously scanning luminance and chrominance. The frames are flanked by synchronizing and audio tracks 22 and 24.

FIG. 1b shows one configuration for black and while with a single row of frames, namely, one sequence $Y_1$, $Y_2$ etc., interlaced with another sequence $Z_1$, $Z_2$, etc. A magnetic track 24 along one edge of the film carries the sound information for the Y frames with a synchronizing signal superimposed. A similar track 26 is provided at the other edge for the Z frames.

Clearly, FIGS. 1, 1a and 1b represent only a few of the many possible arrangements and equally the apparatus used to reproduce from the film can take a wide variety of forms. As one example of apparatus for use with the film of FIG. 1, FIGS. 2 and 3 show an arrangement in which the film is pulled through a gate 40 in front of a conventional flying spot scanner 42. Two side by side images of the scanning raster are formed on the luminance and chrominance frames, respectively, passing through the gate by means of a split lens 44, although other optical arrangements can be used.

Light transmitted by the luminance and chrominance frames is picked up by respective photomultipliers 46 and 48 connected to luminance channel circuits 50 and chrominance channel circuits 52. The particular form of these circuits and indeed the form of the recorded chrominance signal constitute no part of the present invention and they are thus not described. They can be varied as required to achieve compatibility with an existing color system for which the receiver, to which the apparatus according to the invention is an attachment, is designed.

The audio signal is picked up from the track 24 or 26 by a playback head 54 feeding audio stages 56. In order to recover the synchronizing information, the track 22 is illuminated by a light source 58 (FIG. 3), the transmitted light being picked up by the luminance photomultiplier 46. The synchronizing signals thus superimposed on the Y channel video are separated by a circuit 60 and used in conventional manner, preferably with a flywheel circuit, to control the time-bases 62 which establish the scanning raster of the flying spot scanner 42.

If preferred, the light transmitted by the track 22 could be picked up separately by a phototransistor, for example, thus keeping the synchronizing information separate from the luminance information.

The synchronizing circuits can be as described in the specification of copending application Ser. No. 792,408, filed Jan. 21, 1969, although simpler circuits which use only frame markers on the synchronizing track have been found to work satisfactorily.

I claim:

1. Apparatus comprising means for moving film through a scanning location at a constant speed, means for scanning frames on the moving film at the scanning location with a raster of lines in which the frame scanning is in the same direction as the direction of film movement and at substantially half the speed of the film, and means located to receive light from the scanned film frames for providing a video signal in response to the light received.

2. Apparatus according to claim 1 for use with film having luminance and chrominance information represented separately in separate series of film frames, comprising optical system means located to receive the raster of the scanning means for forming two adjacent images of the raster simultaneously scanning separate frames on the film, and said means located to receive light including two light responsive means for receiving light from the separate frames, respectively, whereby luminance and chrominance information recorded on the separate frames are scanned simultaneously.

3. Apparatus according to claim 2, wherein the adjacent images are side by side.

4. Apparatus according to claim 2 for use with film having synchronizing signals recorded thereon, comprising means responsive to the synchronizing signals recorded on the film for controlling the means for scanning in accordance with the synchronizing signals.

5. Apparatus according to claim 4, wherein the synchronizing signal responsive means comprises a light source for illuminating a synchronizing track on the film and pickup means located to receive and responsive to light transmitted by the synchronizing track.

6. Apparatus according to claim 5, wherein the pickup means comprises one of the said light responsive means and circuit means coupled to one of the said light responsive means for separating the synchronizing signals.

7. Apparatus according to claim 1, wherein said means for scanning comprises a flying spot scanner.

8. Apparatus according to claim 1 for use with film having synchronizing signals recorded thereon, comprising means responsive to the synchronizing signals recorded on the film for controlling the means for scanning in accordance with the synchronizing signals.

9. Apparatus according to claim 8 wherein the synchronizing signal responsive means comprises a light source for illuminating a synchronizing track on the film and pickup means located to receive and responsive to light transmitted by the synchronizing track.

10. Apparatus according to claim 9, wherein the pickup means comprises the said light responsive means and circuit means coupled to the light responsive means for separating the synchronizing signals.

11. Apparatus for converting, to a video signal, information presented on frames of a length of film; the apparatus comprising means for moving the film at a substantially constant speed through a scanning location, scanning means for scanning frames on the film with a raster of scanning lines, means for controlling the scanning means to provide movement of the raster in the direction of film movement at a rate which is a fraction of the rate of film movement and for registering the raster with only one out of a predetermined number of frames along the film, means for receiving the light from the scanned frames, and means for converting the received light to a video signal representing the information of the scanned frames.